US011178173B2

(12) United States Patent
Lindholm et al.

(10) Patent No.: US 11,178,173 B2
(45) Date of Patent: Nov. 16, 2021

(54) TECHNIQUE FOR HANDLING ACCESSES OF USER EQUIPMENTS

(71) Applicant: Telefonaktiebolaget LM Ericsson (publ), Stockholm (SE)

(72) Inventors: Fredrik Lindholm, Tokyo (JP); Venkata Ramesh Balabhadruni, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 278 days.

(21) Appl. No.: 15/554,137

(22) PCT Filed: Mar. 10, 2015

(86) PCT No.: PCT/EP2015/054932
§ 371 (c)(1),
(2) Date: Aug. 28, 2017

(87) PCT Pub. No.: WO2016/141970
PCT Pub. Date: Sep. 15, 2016

(65) Prior Publication Data
US 2018/0041495 A1  Feb. 8, 2018

(51) Int. Cl.
*H04L 29/06* (2006.01)
*H04W 76/32* (2018.01)
*H04W 12/08* (2021.01)
*H04W 12/125* (2021.01)
(Continued)

(52) U.S. Cl.
CPC ........ *H04L 63/1458* (2013.01); *H04L 63/083* (2013.01); *H04L 63/1425* (2013.01);
(Continued)

(58) Field of Classification Search
CPC ...... H04L 63/0263; H04W 48/02; H04W 4/60
See application file for complete search history.

(56) References Cited

U.S. PATENT DOCUMENTS 8,413,209 B2 *  4/2013  Aldera ................. H04W 8/245
                                                        726/1
2008/0229088 A1 *  9/2008  Barth ................. H04L 63/0263
                                                        713/1
(Continued)

FOREIGN PATENT DOCUMENTS

WO  2013044959 A1  4/2013
WO  2013167178 A1  11/2013

OTHER PUBLICATIONS

Debasish; Delete Session Request ? Delete Bearer Request ? Delete Bearer Command; May 18, 2015; http://wifilte.blogspot.com/2015/05/delete-session-request-delete-bearer.html (Year: 2015).*
(Continued)

*Primary Examiner* — James R Turchen
(74) *Attorney, Agent, or Firm* — Sage Patent Group (57) ABSTRACT

A technique for handling an access from a user equipment (110) accessing an application function (150) is provided. As to a method aspect of the technique, the access is received via a packet core network (140) of a mobile telecommunications network (100). The application function (150) determines that the access from the user equipment (110) fulfills a predefined access pattern. The application function (150) triggers sending of a control message to the packet core network (140) in response to the determination. The control message controls the packet core network (140) to terminate a session with the user equipment (110).

23 Claims, 8 Drawing Sheets

(51) Int. Cl.
  *H04W 92/24* (2009.01)
  *H04W 88/14* (2009.01)

(52) U.S. Cl.
  CPC ......... *H04W 12/08* (2013.01); *H04W 12/125* (2021.01); *H04W 76/32* (2018.02); *H04L 63/108* (2013.01); *H04L 65/1016* (2013.01); *H04W 88/14* (2013.01); *H04W 92/24* (2013.01)

(56) References Cited

U.S. PATENT DOCUMENTS

| | | | | |
|---|---|---|---|---|
| 2009/0288165 | A1* | 11/2009 | Qiu | H04L 63/14 726/23 |
| 2011/0171958 | A1* | 7/2011 | Hua | H04L 65/1073 455/435.2 |
| 2012/0129517 | A1* | 5/2012 | Fox | H04L 25/03987 455/425 |
| 2012/0236753 | A1* | 9/2012 | Rados | H04L 65/80 370/253 |
| 2012/0291125 | A1* | 11/2012 | Maria | H04W 28/0268 726/22 |
| 2013/0254831 | A1* | 9/2013 | Roach | H04L 63/20 726/1 |
| 2013/0340047 | A1* | 12/2013 | Runeson | H04L 63/08 726/4 |
| 2014/0307706 | A1 | 1/2014 | Keller et al. | |
| 2015/0341361 | A1* | 11/2015 | Fransen | H04L 63/1416 455/410 |
| 2017/0188303 | A1* | 6/2017 | Bas Sanchez | H04W 4/14 |

OTHER PUBLICATIONS

3GPP TS 29.274 V12.7.0 (Dec. 2014); 3rd Generation Partnership Project; Technical Specification Group Core Network and Terminals;3GPP Evolved Packet System (EPS);Evolved General Packet Radio Service (GPRS); Jan. 2015 (Year: 2015).*

3rd Generation Partnership Project, "Technical Specification Group Core Network and Terminals; Representational State Transfer (REST) reference point between Application Function (AF) and Protocol Converter (PC)(Release 12)", 3GPP TS 29.201 V12.1.0, Dec. 2014, pp. 1-40.

3rd Generation Partnership Project, "Technical Specification Group Core Network and Terminals; Policy and Charging Control over Rx reference point (Release 12)", 3GPP TS 29.214 V12.5.0, Sep. 2014, pp. 1-61.

3rd Generation Partnership Project, "Technical Specification Group Core Network and Terminals; Policy and Charging Control (PCC); Reference points (Release 12)", 3GPP TS 29.212 V12.6.0, Sep. 2014, pp. 1-112.

3rd Generation Partnership Project, "Technical Specification Group Services and System Aspects; General Packet Radio Service (GPRS) enhancements for Evolved Universal Terrestrial Radio Access Network (E-UTRAN) access (Release 13)", 3GPP TS 23.401 V13.0.0, Sep. 2014, pp. 1-308.

3rd Generation Partnership Project, "Technical Specification Group Core Network and Terminals; Policy and Charging Control signalling flows and Quality of Service (QoS) parameter mapping (Release 12)", 3GPP TS 29.213 V12.5.0, Sep. 2014, pp. 1-207.

Office Action issued in EP application No. 15708825.3; dated Sep. 5, 2019; 05 pages. All references cited therein have been previously made of record.

Office Action issued in corresponding EP Application No. 15708825.3 dated May 12, 2020, 05 Pages.

Office Action issued in corresponding EP Application No. 15708825.3 dated Mar. 12, 2021, 06 Pages.

* cited by examiner

TECHNIQUE FOR HANDLING ACCESSES OF USER EQUIPMENTS

TECHNICAL FIELD

The present disclosure generally relates to a technique for handling accesses from a user equipment. More specifically, and without limitation, methods and devices are provided for handling accesses from an abusing or misbehaving user equipment that accesses an application function of a mobile telecommunications network.

BACKGROUND

An application function (AF), e.g. providing Voice over Internet Protocol (VoIP), is accessible in a mobile telecommunications network for user equipments (UEs). In the context of a 3GPP implementation of the mobile telecommunications network, an Internet Protocol Multimedia Subsystem (IMS) is an example for the AF. In the context of a Long Term evolution (LTE) implementation, VoIP is also referred to as VoLTE.

The mobile telecommunications network establishes and provides for the communication between the UEs and the AF by means of a packet core network (PCN). An abusing UE, e.g. a UE that acts to the disadvantage of other UEs, or a misbehaving UE, e.g., a UE that does not comply with a technical standard or a subscription for the UE, can be identified at the AF.

But even after excluding the identified UE from the AF, the identified UE can still access the PCN and/or cause the PCN to forward access messages towards the AF, e.g., to a proxy server of the AF. Consequently, the identified UE can still give rise to signaling, e.g., unnecessary network data traffic and/or malicious commands performed or triggered by the PCN.

SUMMARY

Accordingly, there is a need for a technique that protects or limits the effect of certain user equipments accessing a mobile telecommunications network.

As to one aspect, a method of handling an access from a user equipment accessing an application function (AF) via a packet core network (PCN) of a mobile telecommunications network is provided. The method comprises a step of determining by the AF that the access from the user equipment fulfills a predefined access pattern; and a step of triggering sending of a control message to the PCN in response to the determination, the control message controlling the PCN to terminate a session with the user equipment.

Optionally, the access to the AF from the user equipment may be performed via the PCN. E.g., the AF may receive the access from the user equipment via the PCN. The control message may be indicative of the user equipment and/or a cause, e.g., that the user equipment is incompatible, abusing or misbehaving. The AF may provide a packet-based media service, e.g., telephony. At least some embodiments of the technique allow handling incompatible, abusing or misbehaving user equipments, e.g., in a Voice over LTE network.

The AF may be an Internet Protocol (IP) Multimedia Subsystem (IMS). The method may be performed in the IMS. E.g., the method may be performed by a Proxy Call Session Control Function (P-CSCF) of the IMS.

As to another aspect, a method of handling an access from a user equipment accessing an application function (AF) via a packet data network (PCN) of a mobile telecommunications network is provided. The method comprises a step of receiving a control message from the AF, the control message controlling the PCN to terminate a session with the user equipment; and a step of triggering terminating of the session of the PCN with the user equipment in response to the reception.

Optionally, the access from the user equipment may be forwarded via the PCN to the AF. Steps in correspondence to any one of the steps of the one method aspect may further be comprised in the method of the other aspect.

The PCN may be an Evolved Packet System (EPS). The method may be performed in the EPS. E.g., the method may be performed by a Policy and Charging Rules Function (PCRF) of the EPS.

As to a further aspect, a computer program product is provided. The computer program product comprises program code portions for performing any one of the steps of the method aspects disclosed herein when the computer program product is executed by one or more computing devices. The computer program product may be stored on a computer-readable recording medium. The computer program product may also be provided for download via a data network, e.g., the mobile telecommunications network and/or the Internet.

As to a further aspect, a device for handling an access from a user equipment accessing an application function (AF) via a packet core network (PCN) of a mobile telecommunications network is provided. The device comprises one or more processors adapted to determine at the AF that the access from the user equipment fulfills a predefined access pattern, and to trigger sending of a control message to the PCN in response to the determination, the control message controlling the PCN to terminate a session with the user equipment.

The AF may be an Internet Protocol (IP) Multimedia Subsystem (IMS). The device may be implemented in the IMS. E.g., the device may be implemented by a Proxy Call Session Control Function (P-CSCF) of the IMS.

As to another aspect, a device for handling an access from a user equipment accessing an application function (AF) via a packet core network (PCN) of a mobile telecommunications network is provided. The device comprises one or more processors adapted to receive a control message from the AF, the control message controlling the PCN to terminate a session with the user equipment, and to trigger terminating of the session of the PCN with the user equipment in response to the reception.

The PCN may be an Evolved Packet System (EPS). The device may be implemented in the EPS. E.g., the device may be implemented by a Policy and Charging Rules Function (PCRF) of the EPS.

As to a further aspect, a mobile telecommunications network is provided. The mobile telecommunications network is connected or connectable to a plurality of user equipments. The connection may be by wire or wireless. The mobile telecommunications network comprises an application function (AF) including at least one device according to the one aspect, and a packet core network (PCN) coupled to the AF for receiving a control message by at least one device according to the other aspect.

The devices may further include any feature disclosed in the context of the method aspects. Particularly, any one of the units, or a dedicated unit, may be adapted to perform one or more of the steps of any one of the method aspects. Each of the devices may include, or may be implemented by, one or more nodes of the mobile telecommunications network.

Advantageous embodiments are specified by the depending claims.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific network environment, in order to provide a thorough understanding of the technique disclosed herein. It will be apparent to one skilled in the art that the technique may be practiced in other embodiments that depart from these specific details. Moreover, while the following embodiments are primarily described for a Long Term Evolution (LTE) implementation, it is readily apparent that the technique described herein may also be implemented in any other wireless communication network, including a Wireless Local Area Network (WLAN or WiFi) according to the standard family IEEE 802.11 (e.g., IEEE 802.11a, g, n or ac) and/or a Worldwide Interoperability for Microwave Access (WiMAX) according to the standard family IEEE 802.16.

Moreover, those skilled in the art will appreciate that the services, functions, steps and units explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising a computer processor and memory coupled to the processor, wherein the memory is encoded with one or more programs that may perform the services, functions, steps and implement the units disclosed herein.

Figure 1:
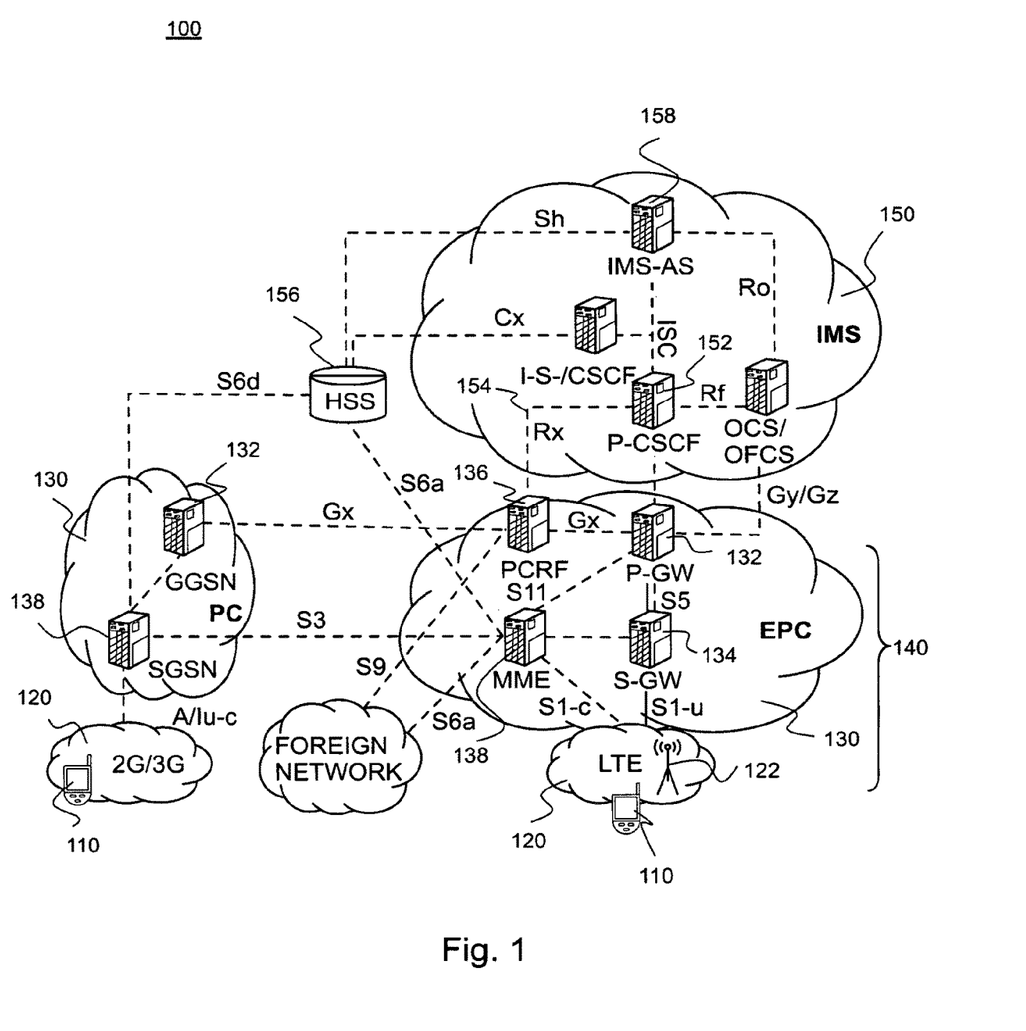
FIG. 1 schematically illustrates an exemplary mobile telecommunications network comprising an application function and a packet core network.

FIG. 1 schematically illustrates a mobile telecommunications network 100 as an exemplary environment for implementing the technique. The telecommunications network 100 comprises a packet core network (PCN) 140 and an application function (AF). The PCN 140 provides access to user equipments (UEs) 110. In an LTE implementation, the PCN is also referred to as an Evolved Packet System (EPS).

For clarity and not limitation, embodiments are described with reference to an Internet Protocol (IP) Multimedia Subsystem (IMS) 150 as an example for the AF.

More specifically, the PCN 140 includes a packet core 130 and one or more radio access networks (RANs) 120. Each of the RANs 120 includes one or more radio base stations (RBSs) 122 for radio communication with the UEs 110. In the LTE implementation (illustrated at the right-hand side of FIG. 1), the RBS 122 is an evolved Node B (eNB). The packet core 130 is an Evolved Packet Core (EPC) or Evolved 3GPP Packet-Switched Domain.

The packet core 130 is connected to one or more of the RANs 120. E.g., the packet core illustrated at the left-hand side of FIG. 1 is connected to a GSM radio access network (GRAN or GERAN) and/or a Universal Terrestrial Radio Access Network (UTRAN). The EPC 130 illustrated at the right-hand side of FIG. 1 is connected to an Evolved UTRAN (E-UTRAN) according to document 3GPP TS 23.401 (e.g., Version 13.1.0). Alternatively or in addition, the EPC is connected to a non-3GPP RAN (e.g., a WLAN) according to document 3GPP TS 23.402 (e.g., Version 13.0.0).

The EPC 130 includes a packet data network (PDN) gateway (P-GW) 132. The P-GW 132 connects the EPC with Internet Protocol (IP) services, e.g., the IMS 150 or an Internet service. The EPC 130 further includes a serving gateway (S-GW) 134 for routing and forwarding user data packets from and to the RBS 122, e.g., the eNB in the LTE implementation. The S-GW 122 also acts as a mobility anchor for the user plane during inter-eNB handovers and as an anchor for mobility between LTE and other RANs.

A Mobility Management Entity (MME) 138 of the EPC 130 triggers bearer activation and bearer deactivation at the P-GW 132. The MME 138 determines the S-GW 134 for each of the UE 110 at initial attach and prior to an intra-LTE handover involving a relocation of the packet core network node. The MME 138 authenticates the UE 110, i.e. determines a subscriber of the UE 110, by interacting with a Home Subscriber Server (HSS) 156.

In the packet core 130 for GSM and UMTS, a Gateway GPRS Support Node (GGSN) 132 connects the GPRS packet core 130 to an alternative application function located in a service data network, e.g., the Internet. A Serving GPRS Support Node (SGSN) 138 provides mobility management and session management.

The HSS 156 comprises a central database for user-related and subscription-related information. The HSS 156 is queried by the PCN 140 for mobility management, call and session establishment, user authentication and access authorization. The HSS 156 is also queried by the IMS 150 for registration, user authentication and access authorization.

The IMS 150 provides an architectural framework for delivering IP multimedia services. IMS provides standardized voice and data services, e.g., Voice over LTE (VoLTE). A Proxy Call Session Control Function (P-CSCF) 152 is the first point of contact for the UE 110 in the IMS 150. The P-CSCF 152 performs resource reservation and controls the access to the IMS 150 for the UE 110.

A Policy and Charging Rules Function (PCRF) 136 of the EPC controls the one or more gateways 132 in the one or more packet cores 130. Control messages are exchanged between the PCN 140 and the IMS 150 via an Rx reference point 154, i.e., an interface connecting the PCRF 136 and the P-CSCF 152.

Prior to establishing a VoLTE session, the UE 110 performs an EPS attach procedure, sets up a PDN connection and acquires one or more P-CSCF IP addresses assigned by the P-GW 132 through P-CSCF discovery. The UE 110 then registers with the IMS 150 to use the services delivered by the IMS 150.

If the registered UE 110 misbehaves or abuses the IMS 150, the IMS 150 (e.g., using the P-CSCF 152 of the IMS 150) puts the UE in quarantine and/or blocks the UE 110 for a configurable period of time. During the blocking period, the IMS 150 drops all the signaling messages from the UE 110. Eventually, the IMS 150 may release all the SIP dialogs of the UE 110 and forcefully de-register the UE 110.

When the UE 110 is blocked and the P-CSCF 152 drops the signaling messages from the UE 110, the UE 110 will retransmit the SIP messages or send new SIP messages causing unnecessary signaling in the PCN 140, e.g., on the RAN 120 and in the EPC 130. Such unwanted signaling consumes capacity in the mobile telecommunications network 100. Alternatively or in combination, such signaling can include faulty software from UE 110 or deliberately created faulty behavior of the UE 110.

At some point, the blocked UE 110 determines that the P-CSCF 152 is unreachable and starts registering or attacking towards other P-CSCFs 152 available in the mobile telecommunications network 100. Hence, the conventional IMS leaves possibilities for the UE 110 to continue to misbehave or abuse the mobile telecommunications network 100, e.g., by sending messages towards the remaining P-CSCFs 152 in the mobile telecommunication network 100.

While embodiments can be implemented in an environment according to, or similar to, the mobile telecommunications network 100, the technique is not limited to the exemplary network environment 100 described above and/or illustrated in FIG. 1. The technique is applicable to any mobile telecommunications network comprising an application function and a packet core network.

Figure 2:
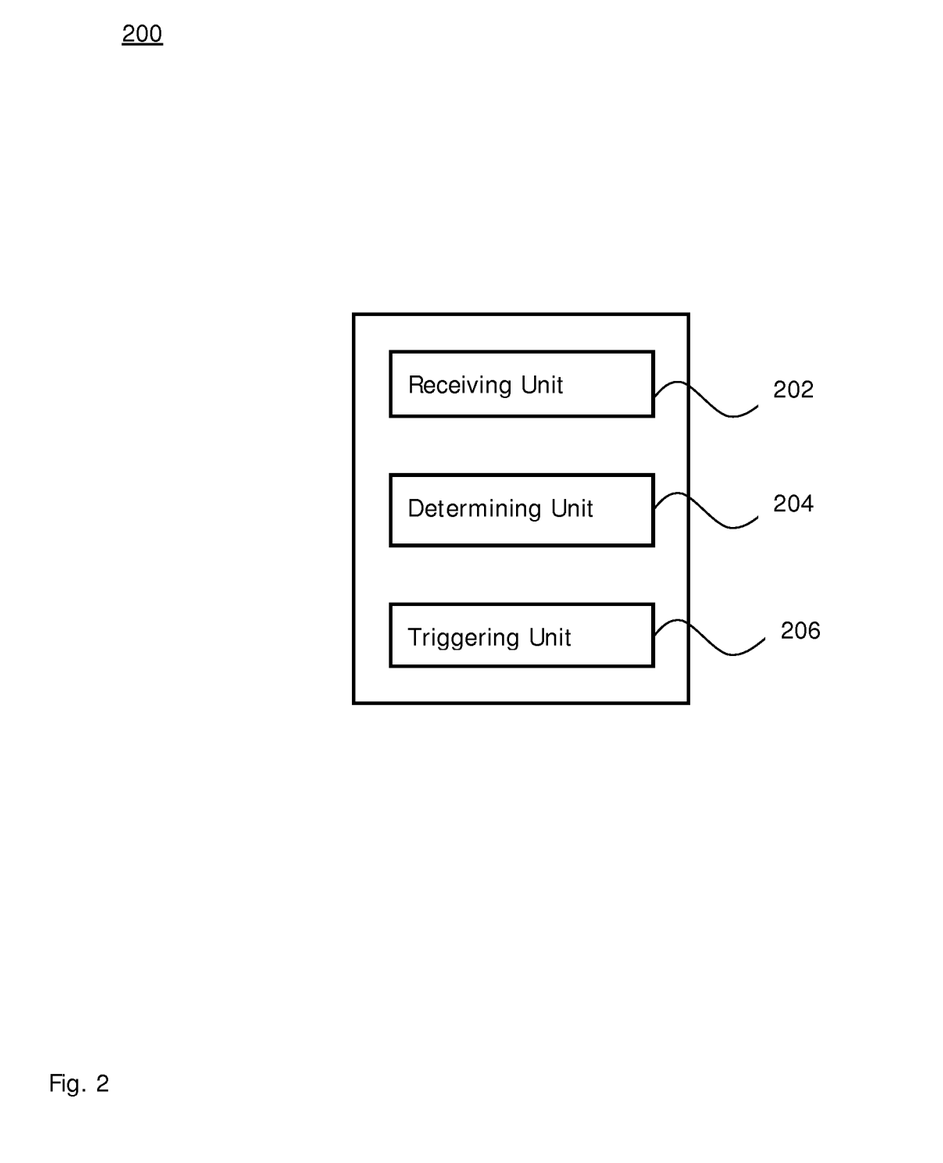
FIG. 2 schematically illustrates a device for handling an access from a user equipment, which is implementable in the application function of FIG. 1.

FIG. 2 schematically illustrates a block diagram of a device 200 for handling an access from a user equipment accessing an IMS via a packet core network (PCN) of a mobile telecommunications network. The device 200 comprises a determining unit 204 adapted to determine at the IMS that the access from the user equipment fulfills a predefined access pattern. The device 200 further comprises a triggering unit 206 adapted to trigger sending of a control message to the PCN in response to the determination. The control message controls the PCN to terminate a session with the user equipment.

The device 200 optionally comprises a receiving unit 202 adapted to receive the access. The device 200 may be implemented in the IMS 150. E.g., the device 200 may be implemented by the P-CSCF 152, an S-CSCF or a dedicated node of the IMS 150.

Figure 3:
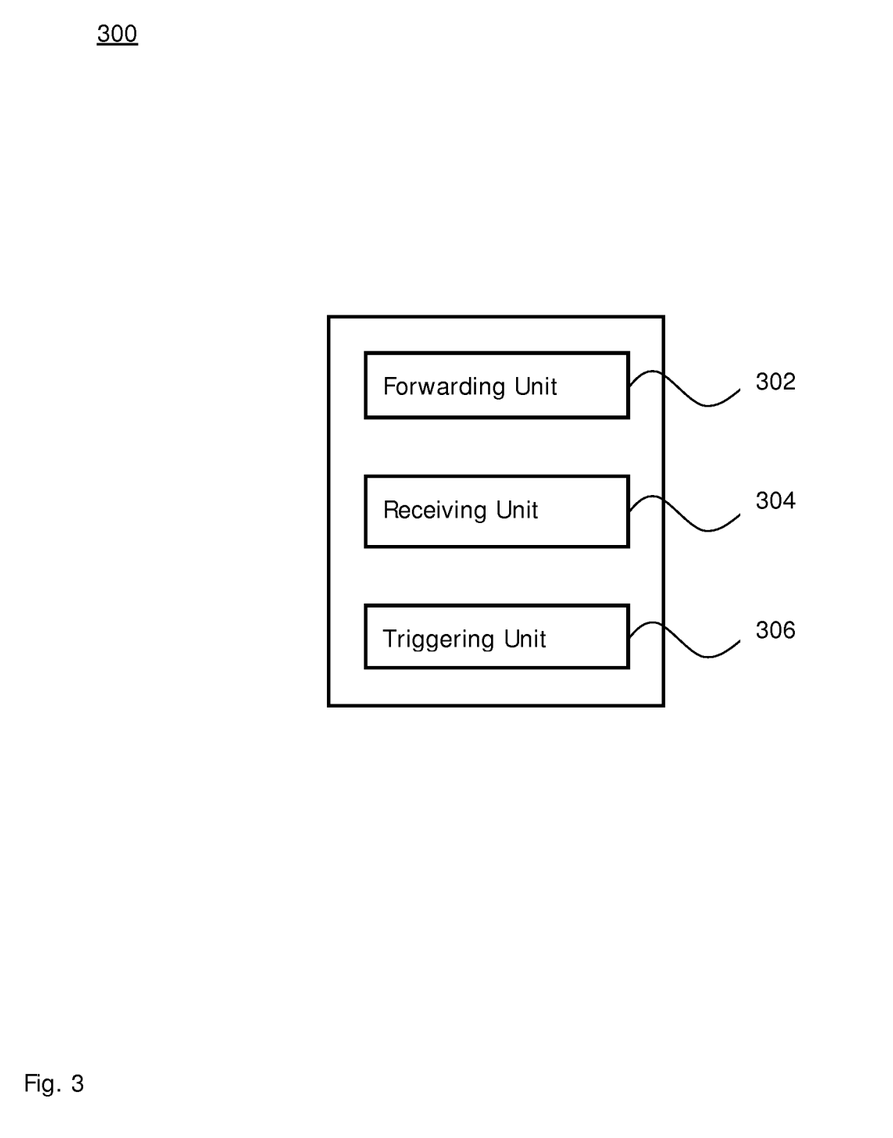
FIG. 3 schematically illustrates a device for handling an access from a user equipment, which is implementable in the packet core network of FIG. 1.

FIG. 3 schematically illustrates a block diagram of a device 300 for handling an access from a user equipment accessing an IMS via a packet core network (PCN) of a mobile telecommunications network. The device 300 comprises a receiving unit 304 adapted to receive a control message from the IMS. The control message controls the PCN to terminate a session with the user equipment. The device 300 further comprises a triggering unit 306 adapted to trigger terminating of the session of the PCN with the user equipment in response to the reception.

The device 300 optionally comprises a forwarding unit 302 adapted to forward the access. The device 300 may be implemented in the PCN 140, e.g., the PCN 140 described above. The device 300 may be implemented by the PCRF 136, by the MME 138 or by a dedicated node of the PCN 140.

The IMS 150 and the PCN 140 may be coupled, e.g., in a control plane of the mobile telecommunications network 100, e.g., using the reference point 154.

Figure 4:
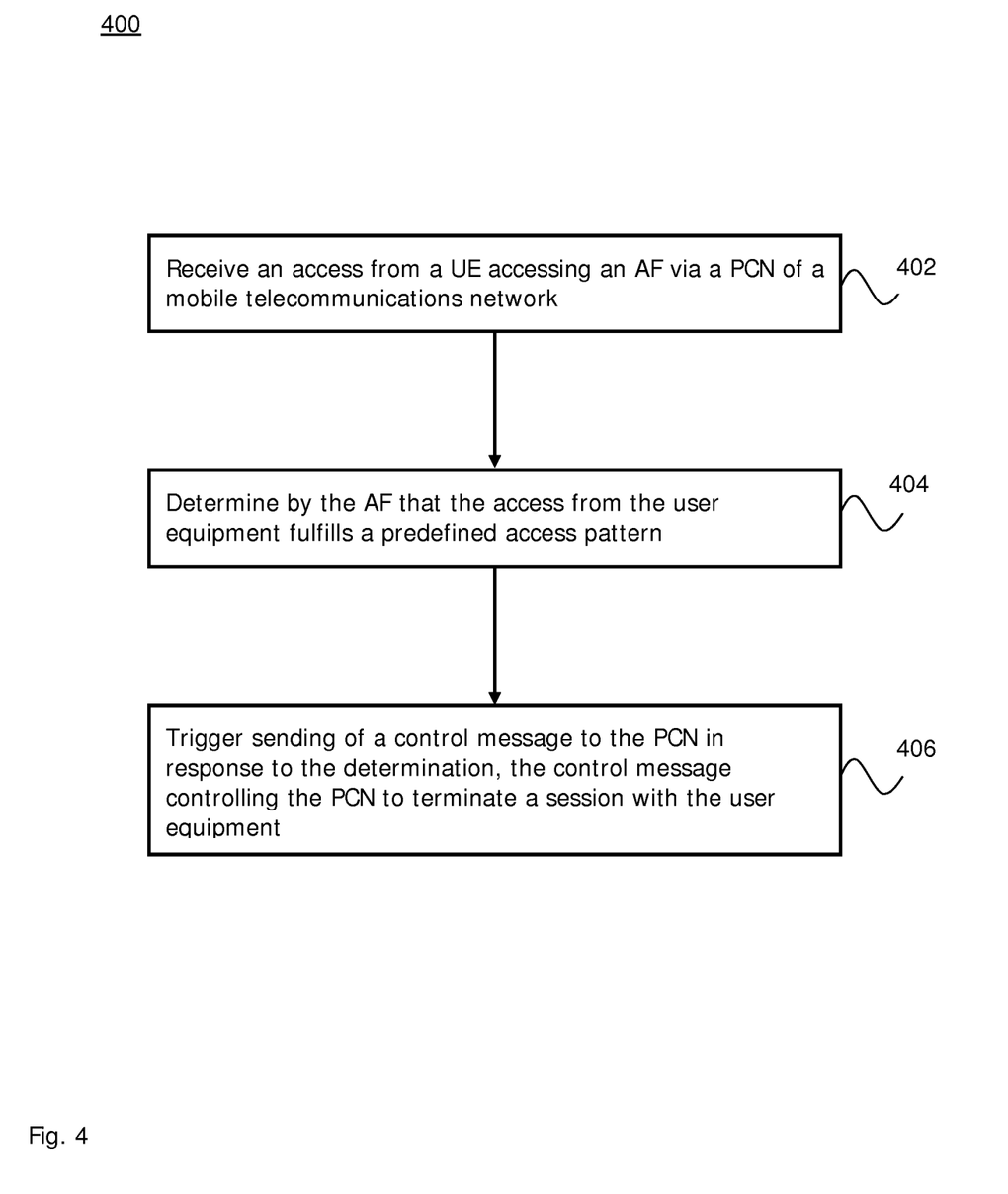
FIG. 4 shows a flowchart for a method of handling an access from a user equipment, which is performable by the device of FIG. 2.

FIG. 4 shows a flowchart for a method 400 of handling an access from a user equipment accessing an IMS via a packet core network (PCN) of a mobile telecommunications network. The method comprises a step 404 of determining by the IMS that the access from the user equipment fulfills a predefined access pattern. In a step 406, sending of a control message to the PCN is triggered in response to the determination. The control message controls the PCN to terminate a session with the user equipment.

The method optionally comprises a step 402 of receiving the access. The method 400 may be performed by the device 200. For example, the units 202, 204 and 206 perform the steps 402, 404 and 406, respectively. The control message may be indicative of the user equipment being misbehaving or abusing the mobile telecommunications network, e.g., a service delivered by the IMS 150.

The IMS 150 and the PCN 140 may be different network or subnetworks. The IMS 150 and the PCN 140 may be different subsystems of the mobile telecommunications network 100. The IMS 150 and the PCN 140 may use different network protocols.

The IMS 150 may provide no direct access to the user equipment. The IMS 150 may be inaccessible for the user equipment without the packet core network 140 (or another packet core network). The PCN 140 may include one or more access networks, e.g., one or more Radio Access Networks (RANs) 120.

The IMS 150 may terminate a packet-switched connected state with the user equipment in response to the determination 404. The IMS may terminate all dialogues with the user equipment.

The determination 404 may include analyzing contents of messages from the user equipment, e.g., an access message or a registration request message. The predefined access pattern may be fulfilled, if the access of the user equipment is technically incompatible with the mobile telecommunications network 100, if the access contradicts a subscription associated with the accessing user equipment and/or if the access is part of an attack against the mobile telecommunications network. The access may include at least one of malicious instructions from the user equipment and a distributed or isolated denial-of-service attack involving the user equipment.

The control message may further control the PCN 140 to block further accesses from the user equipment for a predefined time interval.

The PCN 140 may include at least one of an Internet Protocol Connectivity Access Network (IP-CAN) and an Evolved Packet System (EPS). The IP-CAN may be, or may include the EPS. The IP-CAN (e.g., the EPS) may include one or more Radio Access Networks (RANs). The EPS may include an Evolved Packet Core (EPC) connected to the one or more RANs. The one or more RANs may be configured to receive the access from the user equipment according to one or more Radio Access Technologies. The one or more RANs may include at least one of a Universal Terrestrial Radio Access Network (UTRAN), an Evolved UTRAN (E-UTRAN), a GSM Radio Access Network (GRAN or GERAN) with or without a General Packet Radio Service (GPRS) or Enhanced Data Rates for GSM Evolution (EDGE), and a Wireless Local Area Network (WLAN).

The IMS 150 may provide a packet-switched service to the UE, e.g., a Voice over IP service. The control message may be triggered to be sent by a Proxy-Call Session Control Function (P-CSCF) of the IMS. The P-CSCF may act as a point of entrance to the IP Multimedia Subsystem (IMS) for the accessing user equipment. The control message may be sent to a Policy and Charging Rule Function (PCRF) of the PCN 140. The control message may control the PCRF to terminate the session and/or block the user equipment in the IP-CAN.

The control message may be sent according to a Diameter protocol defined in Request for Comments RFC 6733.

The user equipment may be registered at the IMS 150. The access from the user equipment may include receiving a registration message from the user equipment at the IMS 150. The registration message may trigger a registration of the user equipment at the IMS.

Sending a session binding request to the PCN 140 may be triggered in response to the registration message. The session binding request may trigger an association between the registration at the IMS 150 and the session of the PCN 140 with the user equipment. The session binding request may be sent via a reference point between the IMS 150 and the PCN 140. Via the reference point, a session binding acknowledgement may be received from the PCN 140 in response to the session binding request. The control message may be triggered to be sent via the reference point and/or may refer to the session binding.

The session binding may be performed according to Sect. 5.2 of document 3GPP TS 29.213 Version 13.0.0). The session binding may be the association of information on the registration at the IMS 150 (also referred to as service information) with the session at the PCN 140 (e.g., the IP-CAN session). For example, when the PCN 140 accepts the session binding request including the service information received from the IMS 150 over the reference point, the PCN 140 performs session binding and associate the service IP flows described by the session information and corresponding policy and charging control (PCC) rules to one and only one existing IP-CAN session.

The reference point may be an Rx interface between a functional group in the IMS 150 (e.g., the P-CSCF) and a functional group in the PCN 140 (e.g., the PCRF). In an embodiment of the mobile telecommunications network 100, the reference point may correspond to a physical interface between nodes, or there may not be any physical interface corresponding to the reference point. The reference point may be configured to exchange information between the IMS 150 and the PCN 140, e.g., as to a size of data flows exchanged with, or provided by, the IMS 150.

The session binding request may be an Authentication and Authorization Request (AAR). The session binding acknowledgment may be an Authentication and Authorization Answer (AAA). The MR may be sent according to Sect. 5.6.1 of document 3GPP TS 29.214 Version 13.0.0.

The control message may be sent using an Rx session, if the user equipment is registered at the IMS 150. For example, the control message may be included in a Session Termination Request (STR), e.g., if the user equipment has an ongoing Rx session (e.g., if the session is bound using the Rx reference point). Alternatively or in addition, the control message may be included in an MR message, if the session of the user equipment is not bound via a reference point between the IMS 150 and the PCN 140 (e.g., if the user equipment does not have an ongoing Rx session). Alternatively or in addition, the control message may be included in the MR message, if the user equipment is not registered at the IMS 150.

The control message or a further control message may be triggered to be sent to a subscriber register which may be a Home Subscriber Server (HSS) of the mobile telecommunications network 100 to block further accesses or signaling from the user equipment.

Figure 5:
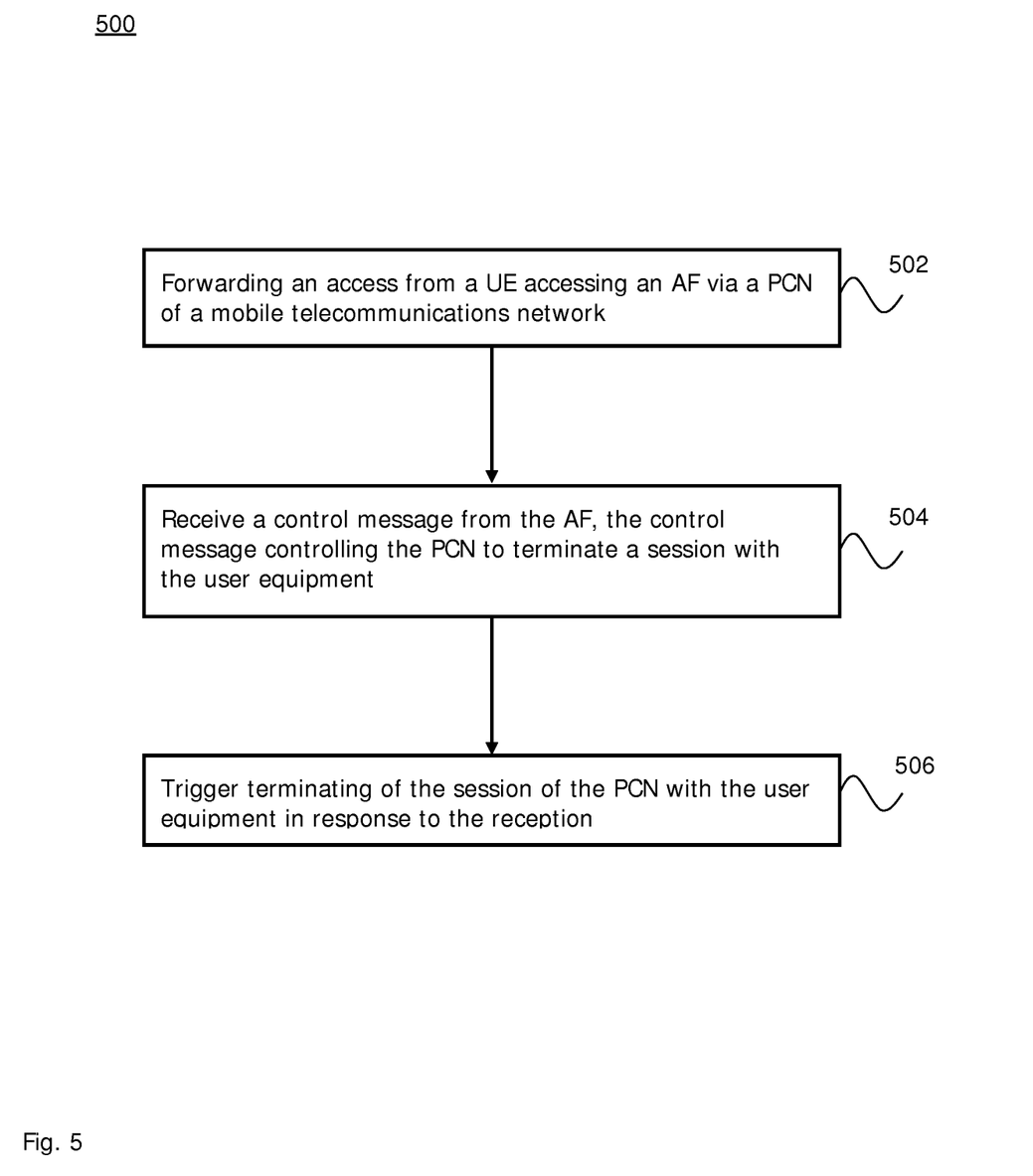
FIG. 5 shows a flowchart for a method of handling an access from a user equipment, which is performable by the device of FIG. 3.

FIG. 5 shows a flowchart for a method 500 of handling an access from a user equipment accessing an IMS via a packet core network (PCN) of a mobile telecommunications network. The method 500 comprises a step 504 of receiving a control message from the IMS. The control message controls the PCN to terminate a session with the user equipment. In a step 506, terminating of the session of the PCN with the user equipment is triggered in response to the reception.

The method 500 optionally comprises a step 502 of forwarding the access. The method 500 may be performed by the device 300. For example, the units 302, 304 and 306 perform the steps 502, 504 and 506, respectively.

Blocking further accesses from the user equipment may be triggered for a predefined time interval in response to the reception 504. Triggering the termination may include triggering sending of a termination message to a gateway linking the IMS 150 and the PCN 140, the termination message controlling the gateway to delete a bearer of the IMS for the user equipment. The gateway may delete all bearers allocated to the user equipment, a default bearer of the user equipment or a dedicated bearer of the user equipment. The gateway may be the P-GW 132.

The termination message may further control at least one of a Mobility Management Entity (MME) and one or more radio base stations of the PCN 140 to release a radio access bearer and/or to block the user equipment from establishing a connection via the PCN 140 for a predefined time interval. The termination message may be forwarded within the PCN 140. E.g., the gateway may forward the termination message to the MME and/or the one or more radio base stations. The MME and/or the one or more radio base stations may release the radio access bearer of the user equipment in response to the termination message. The MME may be the MME 138 of the mobile telecommunications network 100, and/or the radio base stations may include the radio base station 122 of the mobile telecommunications network 100.

In an embodiment implemented in the mobile telecommunications network 100 comprising the IMS 150 as the AF, the P-CSCF 152 identifies that the UE 110 is misbehaving, sending abusing messages, or not compatible with the network 100. The P-CSCF 152 immediately releases all the SIP dialogs of the UE 110 and forcefully de-register the UE 110. While de-registering the UE 110, the P-CSCF 152 sends an "abuse" (or "not compatible") termination cause to the PCRF 136 over the Rx interface 154. Based on the termination cause received at Rx interface 154, the PCRF 136 terminates the IP-CAN session immediately. The PCRF 136, while terminating the IP-CAN session, sends an "abuse" (or "not compatible") session release cause towards P-GW 132. Upon receiving the session release cause, the P-GW 132 deletes the default bearer of the PDN.

While deleting the default bearer of the PDN, the P-GW 132 further propagates the session termination cause value via the S-GW 134 towards the MME 138 and the eNB 122. The MME 138, upon receiving a message including the session termination cause value, puts the UE 110 in quarantine and blocks it for a configurable period of time. During the blocking period, the MME 138 prevents establishing any further IMS PDN connections for the same UE 110. Alternatively or in addition, the MME 138 allows other traffic (e.g., traffic not related to the IMS 150 or Internet traffic) assuming that the UE 110 is not misbehaving from a perspective of the EPC 130 or detrimental for the PCN 140.

In case the UE is originally not registered at P-CSCF 152, the P-CSCF 152 sends the termination cause to the PCRF 136 in an MR message including UE session binding information and an Auth-Session-State AVP the value set to "NO_STATE_MAINTAINED" so that the PCRF 136 does not create a new Rx session but still gets the needed information that the UE 110 is abusing. Upon receiving the MR message with the termination cause, the PCRF 136 terminates the IP-CAN session.

As a result, if the UE 110 is originally not registered in the IMS 150, and if the UE 110 is
  (i) incompatible,
  (ii) starts to misbehave towards the IMS 150, or
  (iii) abuses the IMS 150,
the IMS 150 (e.g., using the P-CSCF 152) does not only drop or reject the signaling from the UE 110. The technique prevents such signaling by means of the control message. The control message is sent whether or not the UE 110 is registered in the IMS 150. A mode of sending the control message depends on whether or not the UE 110 is registered in the IMS 150.

In an embodiment, the device 200 determines that the UE 110 is not compatible with the mobile telecommunications network 100, is misbehaving, or is sending abusing messages by looking into contents of access messages from the UE 110. For example, the device 200 may determine that the packets from UE 110 cannot be decoded and/or that rejections from an IMS core network, e.g., an IMS application server 158, exceed a frequency threshold. The determination 404 may further depend on indications in messages from the IMS core network 158 and/or a terminal type or client type of the UE 110.

Figure 6:
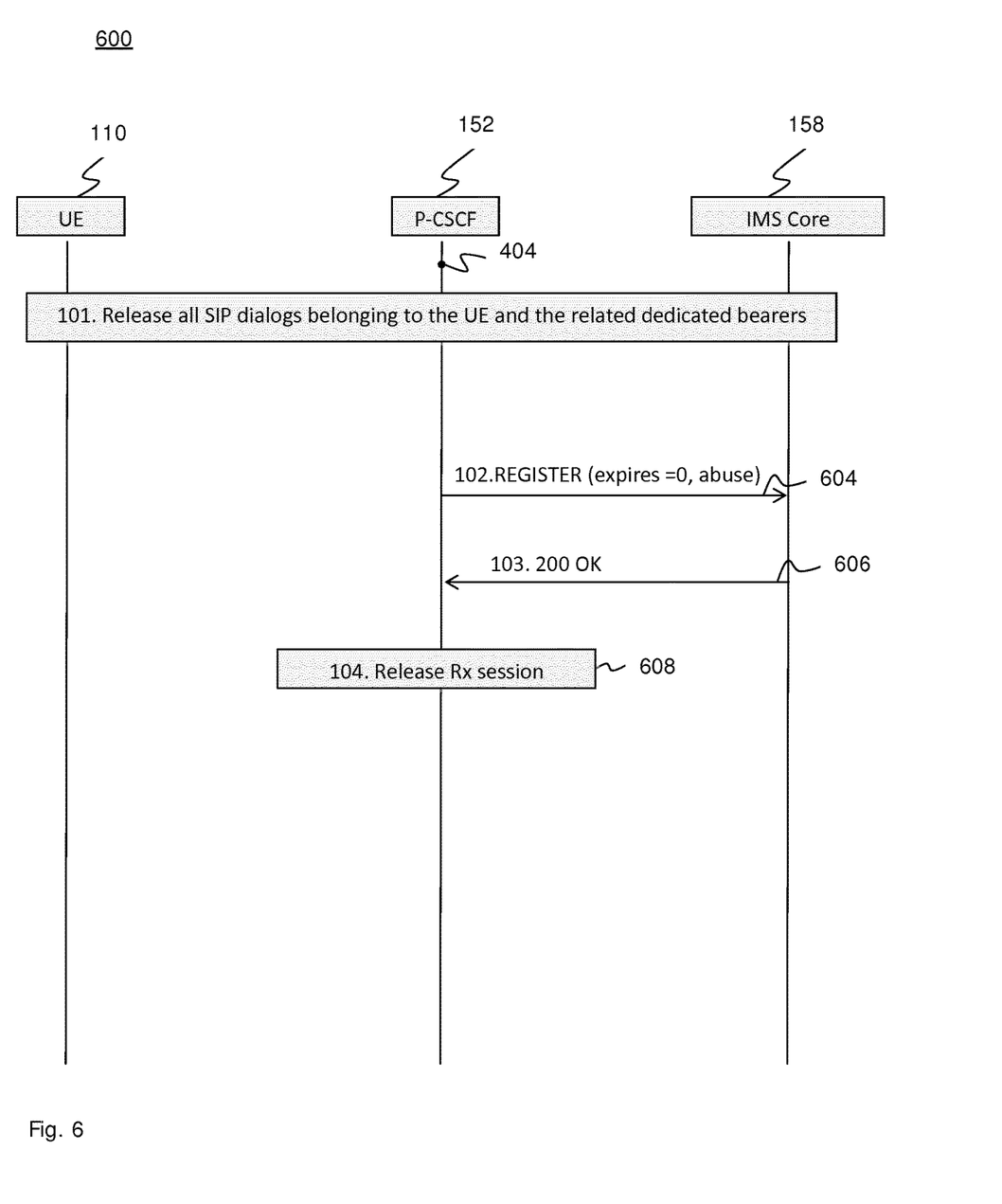
FIG. 6 shows a signaling flow resulting from a first embodiment.

FIG. 6 schematically illustrates a signaling flow 600 for de-registering the UE 110. When the IMS network 150, e.g. the P-CSCF 152, determines that the UE 110 is not compatible, misbehaving or sending abusing messages according to the step 404, the P-CSCF 152 immediately release all SIP dialogs of the UE 110 and release all bearers dedicated to the UE 110 in a step 602. The P-CSCF 152 then forcefully de-registers the UE 110 by sending a register message 604, e.g., including an expiration interval equal to zero. Optionally, the P-CSCF 152 adds a termination cause indication (e.g., "abuse" or "not compatible") in the de-registration message 604 towards the IMS core network 158. The P-CSCF 152 initiates releasing the Rx session and releasing a default bearer in a step 608.

In some embodiments, the IMS core network 158, e.g., based on preset operation rules (also referred to as local policies), further propagate information as to the de-registration of the UE 110 and/or the termination cause indication for the UE 110 to the HSS 156.

Figure 7:
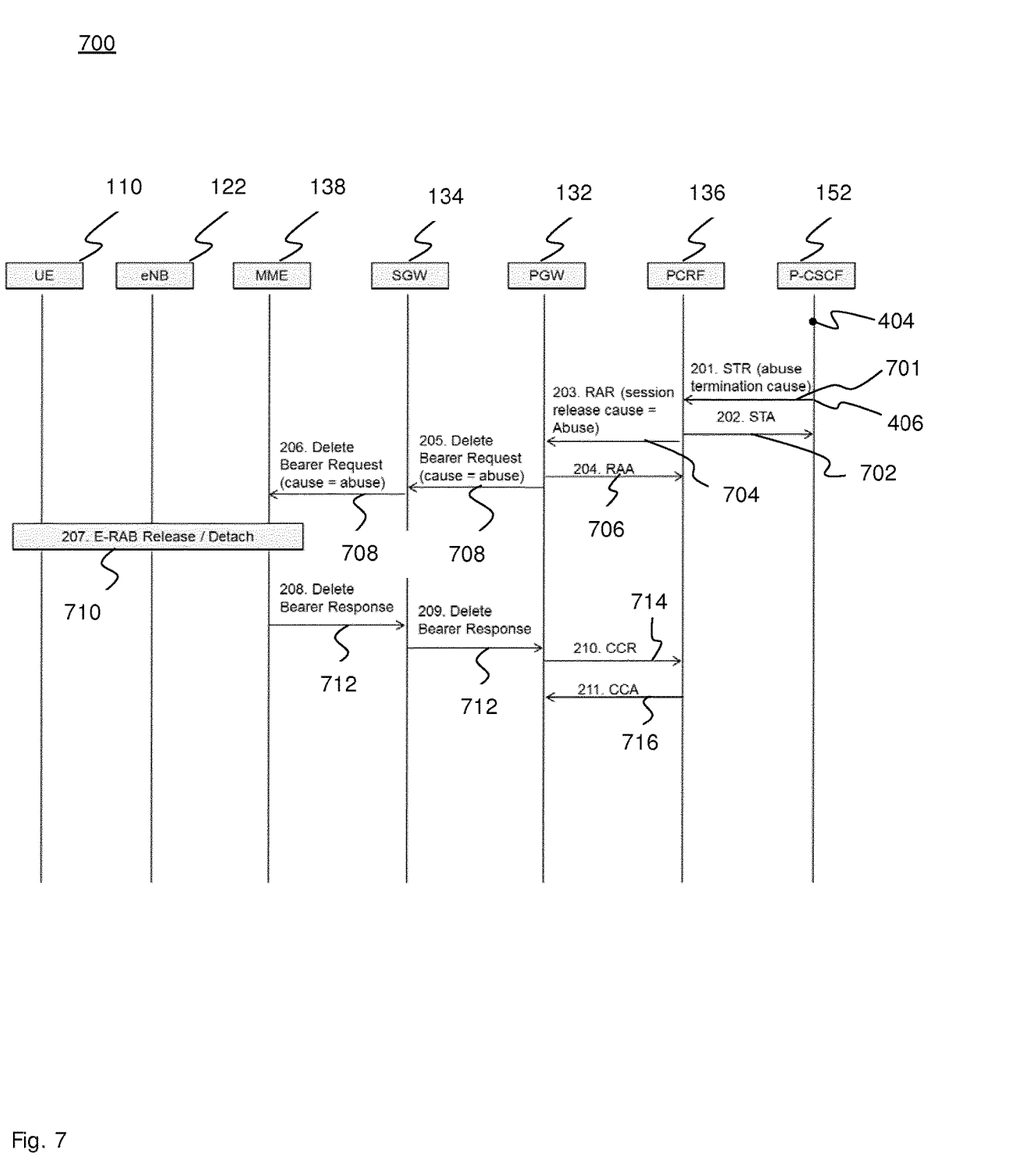
FIG. 7 shows a signaling flow resulting from a second embodiment.

FIG. 7 schematically illustrates a signaling flow 700 resulting from an exemplary implementation of the step 608 of deleting the default bearer during de-registration of the UE 110.

For de-registering the UE 110, the P-CSCF 152 sends a Session Termination Request (STR) 701 as the control message to the PCRF 136 in the step 406. Optionally, the control message 701 includes the termination cause indication (e.g., "abuse" or "not compatible"). The STR control message is sent to PCRF 136 over the Rx interface 154. Based on the termination cause indication received over the Rx interface 154 in the step 504, the PCRF 136 terminates the session, e.g., an IP-CAN session, immediately according to the step 506.

The PCRF 136 sends a session termination request message 704 for terminating the session of the PCN 140 with the UE 110, e.g., an IP-CAN session. By way of example, the PCRF 136 adds an indication for a session release cause (e.g., "abuse" or "not compatible") in a Re-Authentication Request (RAR) message as the session termination request message 704 towards the P-GW 132. The PCRF 136 indicates that session release has been triggered by sending a Session Termination Acknowledgement (STA) message 702 to the P-CSCF 152.

Upon receiving the IP-CAN session termination request message 704 with the session release cause indication, the P-GW 132 deletes the default bearer of the PDN allocated to the UE 110. The P-GW 132 indicates that bearer deletion has been triggered by sending a Re-Authentication Answer (RAA) message 706 to the PCRF 136.

The P-GW 132 further propagates the session release cause indicator (e.g., the value "abuse" or "not compatible") for deleting the default bearer of the PDN. By way of example, the session release cause indicator is included in a bearer deletion request message 708 sent via the S-GW 134 towards the MME 138 and/or the eNB 122.

A radio access bearer (RAB), e.g., an E-UTRAN RAB (E-RAB) transports the packets of the bearer of the PCN 140 between the UE 110 and the EPC 130. Upon receiving the bearer deletion request message 708 for the default bearer, the MME 138 releases a corresponding RAB in a step 710. If the deleted RAB is the last PDN connection (e.g., the default bearer) for the identified UE 110, the MME 138 initiates a detach procedure instead in the step 710.

The MME 138 further defines a quarantine for the identified UE 110 and/or blocks the identified UE 110 for a configurable period of time. A type of the quarantine and/or the time period of blocking is determined based on the session release cause value in bearer deletion request message 708. During the blocking period, the MME 138 does not allow establishing a new IMS PDN connection for the identified UE 110.

The deletion of the bearer is signaled in a response message 712 via the S-GW 134 to the P-GW 132. A Credit Control Request (CCR) message 714 notifies the PCRF 136 as to the default bearer deletion. The PCRF 136 confirms the credit control by sending a Credit Control Answer (CCA) 716 to the P-GW 132.

While FIG. 7 illustrates a simplified signaling flow 700, further protecting mechanisms may be triggered. By way of example, to further avoid that the identified UE 110 retries setting up a new IMS PDN connection, the MME 138 suppresses sending an indication for IMS support to the identified UE 110, e.g., in subsequent Attach or Tracking Area Updates. The IMS support indication may be a value equal or similar to "IMS voice over PS session supported".

Figure 8:
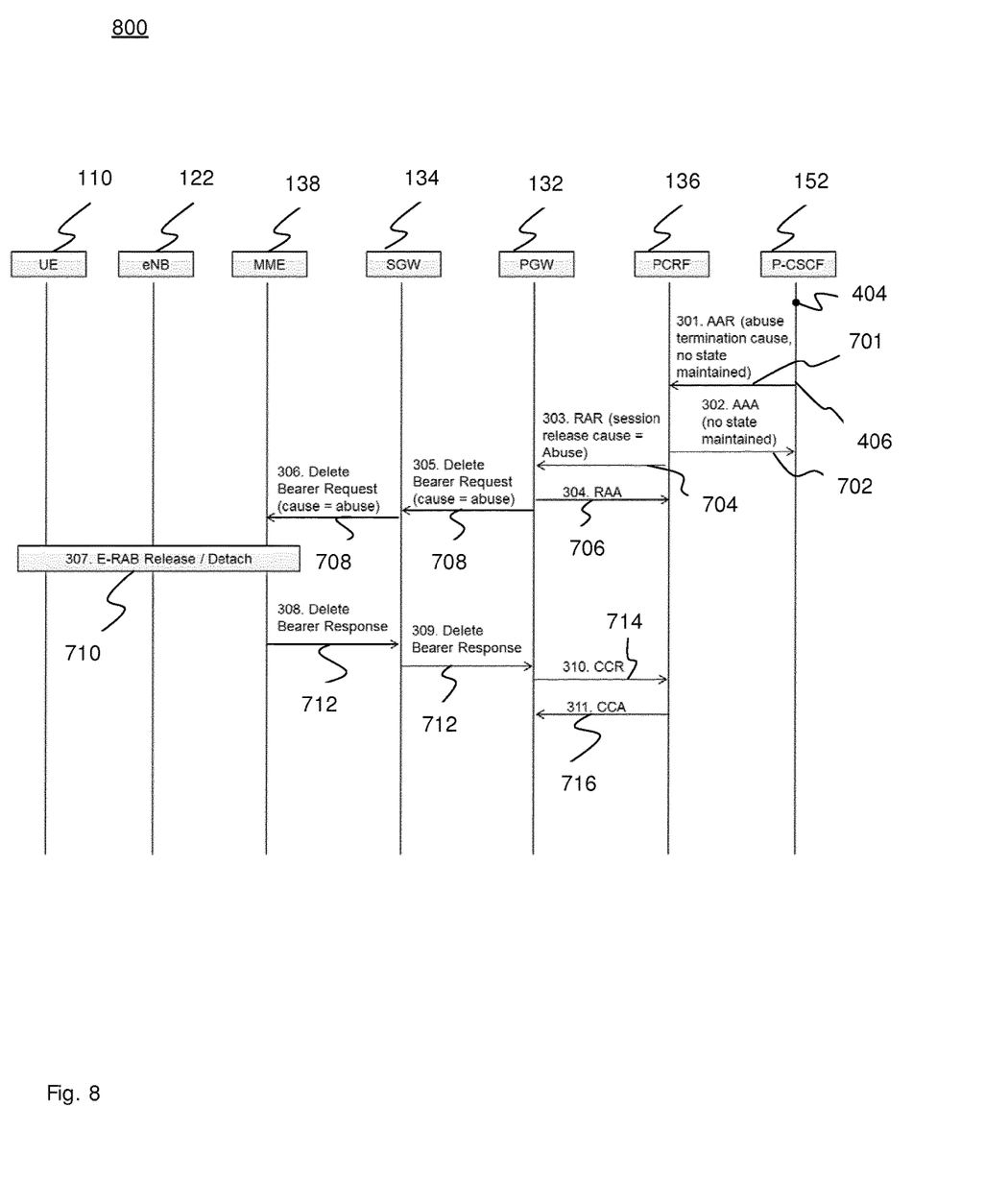
FIG. 8 shows a signaling flow resulting from a third embodiment.

FIG. 8 schematically illustrates a signaling flow 800 resulting from an exemplary implementation of the step 608 of deleting the default bearer (without the need for de-registration of the UE 110), if the UE 110 is not registered in the IMS 150. Like reference signs indicate features correspond to the signaling flow 700.

In case the identified UE 110 is originally not registered at the IMS (e.g., in the IMS 150 or at the P-CSCF 152), the P-CSCF 152 sends the termination cause to the PCRF 136 in an Authorization Request (AAR) message 701 as the control message according to the step 406. The MR message 701 includes session binding information for the identified UE 110 and an Authentication Session State in an Attribute-Value Pair (AVP) with value set to "NO_STATE_MAINTAINED" so that the PCRF 136 receives in the step 504 information as to the UE 110 being not compatible, abusing or misbehaving.

In exemplary implementations of the methods 400 and 500, the PCRF 136 does not create a new Rx session. The Authentication Session State AVP is set to the value "NO_STATE_MAINTAINED" in an Authentication and Authorization Answer (AAA) message 702 to the P-CSCF 152.

Upon receiving the MR message 701 with the termination cause, the PCRF 136 terminates the one or more IP-CAN sessions as specified for the signaling flow 700. E.g., the steps underlying the signaling flow 800 in FIG. 8 are the same as those underlying the signaling flow 700 in FIG. 7 except for the steps relating to the messages 701 and 702 exchanged between the P-CSCF 152 and PCRF 136.

The technique can be complemented with the following variations. If the UE 110 accesses through the RAN 120 providing 2G or 3G access, a signaling flow similar to the signaling flows 700 and 800 is performed. Herein, the node enforcing the blocking of the UE 110 is the SGSN 138 (e.g., instead of the MME 138).

Alternative or in addition, the UE 110 access the IMS 150 using the RAN 120 providing WiFi access. In this case, depending on whether the access is trusted or untrusted, a signaling flow similar to the signaling flows 700 and 800 is performed. For untrusted access using an evolved Packet Data Gateway (ePDG), the P-GW 132 contacts the ePDG to release the PDN for the IMS. The P-GW 132 notifies to an Authentication Authorization and Accounting (AAA) functionality that the UE 110 is blocked (e.g., by sending the indication). The AAA functionality enforces the blocking of any further attempt by the UE 110 trying to re-establish the IMS PDN via the WiFi access (similar to the MME 132 in an LTE implementation). For trusted access, similar procedures apply, wherein the AAA functionality enforces the re-establishment blocking for any further IMS PDN.

In any embodiment implementing 3GPP access (e.g., 2G, 3G and/or LTE access), the MME/SGSN 138 may store an indication in the user profile (e.g., in the HSS/HLR 156). The indication is indicative of the particular UE 110 that has been blocked and/or for which service (e.g., for VoLTE access). If the blocked UE 110 de-attaches and attaches later to another MME/SGSN 138 without a local history for the UE 110, the other MME/SGSN 138 does not have to receive the control message 701 but controls its PDN based on the stored indication, e.g., when downloading the user profile from the HSS/HLR 156. As a result, the UE 110 is blocked from setting up a PDN connection for IMS at the EPS attach.

The MME/SGSN 138 further clears the indication stored in the user profile, when it is the time to allow the UE 110. Alternatively or in addition, the MME/SGSN 138 stores the time until which the UE 110 is blocked (e.g., in order to avoid a permanent blocking).

Generally, the P-CSCF 152 or a corresponding functional group in the IMS 150 detects the UE 110 that is to be blocked, and sends information to the PCRF 136 or a corresponding functional group in the PCN 140 about the UE 110 to be blocked. The PCRF 136 or the corresponding functional group initiates a release of resources for the UE 110 and further propagates the information in the PCN 140, e.g., to the P-GW 132 and the MME 138 or a corresponding functional group. The MME 138 receives the indication of UE 110 to be blocked and enforces that the UE stays blocked, e.g., for a certain period of time.

As has become apparent from above description of exemplary embodiments, the proposed solution protects the EPC and IMS networks from the unwanted signaling or attacks from an abusing, not compatible or misbehaving UE. Embodiments save EPC and IMS resources. Certain embodiments achieve the blocking even if the UE is not registered in the IMS network and still abuses, is incompatible or misbehaves towards the P-CSCF.

Same or other embodiments avoid that UEs that are not fully compatible with the network access the IMS. E.g., if the UE is not allowed to use VoLTE, the UE is still able to use LTE and CS telephony. An implementation of the technique can thus maintain compatibility with a large number of early VoLTE UEs that are not fully functional with the network. Such situations include, e.g., a user changing the network operator, wherein the new network operator excludes specific terminal types from VoLTE usage.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method of handling an access from a user equipment accessing an application function (AF) via a packet core network (PCN) of a mobile telecommunications network, the method comprising:
    determining, by the AF, that the access from the user equipment fulfills a predefined access pattern, wherein the predefined access pattern is fulfilled by the access from the user equipment that contradicts a subscription associated with accessing the user equipment; and
    triggering sending of a control message to the PCN in response to the determination, the control message controlling the PCN to terminate a session with the user equipment, block further accesses from the user equipment for a predefined time interval, and initiate deletion of a default bearer of a packet data network (PDN) connection of the user equipment.

2. The method of claim 1, further comprising terminating, at the AF, a packet-switched connected state with the user equipment in response to the determination.

3. The method of claim 1, wherein the determining comprises analyzing contents of a message from the user equipment.

4. The method of claim 1, wherein the predefined access pattern is further fulfilled by at least one of the following accesses:
    the access of the user equipment is technically incompatible with the mobile telecommunications network; and
    the access of the user equipment attacks the mobile telecommunications network.

5. The method of claim 3, wherein the access includes at least one of malicious instructions from the user equipment and a denial-of-service attack involving the user equipment.

6. The method of claim 1, wherein:
    the AF includes an Internet Protocol (IP) Multimedia Subsystem (IMS); and
    the control message is triggered to be sent by a Proxy-Call Session Control Function of the IMS.

7. The method of claim 1, wherein the PCN includes at least one of an Internet Protocol Connectivity Access Network and an Evolved Packet System.

8. The method of claim 1, wherein the PCN includes an Evolved Packet Core and one or more Radio Access Networks.

9. The method of claim 1, wherein the control message is triggered to be sent to a Policy and Charging Rule Function of the PCN.

10. The method of claim 1, wherein the access from the user equipment comprises receiving a message from the user equipment at the AF.

11. The method of claim 10, further comprising:
triggering sending, via a reference point between the AF and the PCN, a session binding request to the PCN in response to the message, the session binding request triggering an association between the AF and the session of the PCN with the user equipment; and
receiving, via the reference point, a session binding acknowledgement from the PCN in response to the session binding request,
wherein the control message is triggered to be sent via the reference point and refers to session binding.

12. The method of claim 1, wherein the control message is included in a session termination request to the PCN.

13. The method of claim 1, wherein the control message is included in an Authentication and Authorization Request when the session of the user equipment is not bound via a reference point between the AF and the PCN.

14. The method of claim 1, wherein the control message, or a further control message, is triggered to be sent to a Home Subscriber Server of the mobile telecommunications network to block the further accesses from the user equipment.

15. A method of handling an access from a user equipment accessing an application function (AF) via a packet core network (PCN) of a mobile telecommunications network, the method comprising:
receiving a control message from the AF, the control message controlling the PCN to terminate a session with the user equipment, wherein the control message is received based on a determination that the access from the user equipment fulfills a predefined access pattern, and wherein the predefined access pattern is fulfilled by the access from the user equipment that contradicts a subscription associated with accessing the user equipment;
triggering terminating of the session of the PCN with the user equipment in response to the reception of the control message, wherein the triggering comprises blocking the user equipment from establishing a connection via the PCN for a predefined time interval; and
deleting at least a default bearer of a packet data network (PDN) connection of the user equipment.

16. The method of claim 15, further comprising triggering blocking further accesses from the user equipment for the predefined time interval in response to the reception of the control message.

17. The method of claim 15, wherein triggering the termination comprises triggering sending of a termination message to a gateway linking the AF and the PCN, the termination message controlling the gateway to delete all bearers of the AF for the user equipment.

18. The method of claim 17, wherein the termination message further controls at least one of a Mobility Management Entity and one or more radio base stations of the PCN to release the all bearers.

19. A non-transitory computer readable recording medium storing a computer program product for handling an access from a user equipment accessing an application function (AF) via a packet core network (PCN) of a mobile telecommunications network, the computer program product comprising software instructions which, when run on processing circuitry of a computing device providing the AF, cause the AF to:
determine that the access from the user equipment fulfills a predefined access pattern wherein the predefined access pattern is fulfilled by the access from the user equipment that contradicts a subscription associated with accessing the user equipment; and
trigger sending of a control message to the PCN in response to the determination, wherein the control message controls the PCN to terminate a session with the user equipment, block further accesses from the user equipment for a predefined time interval, and initiate deletion of a default bearer of a packet data network (PDN) connection of the user equipment.

20. A non-transitory computer readable recording medium storing a computer program product for handling an access from a user equipment accessing an application function (AF) via a packet core network (PCN) of a mobile telecommunications network, the computer program product comprising software instructions which, when run on processing circuitry of a computing device, cause the computing device to:
receive a control message from the AF, wherein the control message controls the PCN to terminate a session with the user equipment, wherein the control message is received based on a determination that the access from the user equipment fulfills a predefined access pattern, and wherein the predefined access pattern is fulfilled by the access from the user equipment that contradicts a subscription associated with accessing the user equipment;
trigger a termination of the session of the PCN with the user equipment in response to the reception of the control message, wherein, to trigger the termination of the session of the PCN with the user equipment, the software instructions further cause the computing device to block the user equipment from establishing a connection via the PCN for a predefined time interval; and
delete a default bearer of a packet data network (PDN) connection of the user equipment.

21. A device for handling an access from a user equipment accessing an application function (AF) via a packet core network (PCN) of a mobile telecommunications network, the device comprising:
processing circuitry; and
memory containing instructions executable by the processing circuitry whereby the device is operative to:
determine, at the AF, that the access from the user equipment fulfills a predefined access pattern, wherein the predefined access pattern is fulfilled by the access from the user equipment that contradicts a subscription associated with accessing the user equipment;
trigger sending of a control message to the PCN in response to the determination, wherein the control message controls the PCN to terminate a session with the user equipment, block further accesses from the user equipment for a predefined time interval, and initiate deletion of a default bearer of a packet data network (PDN) connection of the user equipment.

22. A device for handling an access from a user equipment accessing an application function (AF) via a packet core network (PCN) of a mobile telecommunications network, the device comprising:

processing circuitry; and
memory containing instructions executable by the processing circuitry whereby the device is operative to:
receive a control message from the AF, wherein the control message controls the PCN to terminate a session with the user equipment, wherein the control message is received based on a determination that the access from the user equipment fulfills a predefined access pattern, and wherein the predefined access pattern is fulfilled by the access from the user equipment that contradicts a subscription associated with accessing the user equipment;
trigger a termination of the session of the PCN with the user equipment in response to the reception of the control message, wherein, to trigger the termination of the session of the PCN with the user equipment, the device is further operative to block the user equipment from establishing a connection via the PCN for a predefined time interval; and
delete a default bearer of a packet data network (PDN) connection of the user equipment.

23. A mobile telecommunications network, comprising:
an application function (AF) including a first device for handling an access from a user equipment accessing the AF via a packet core network (PCN) of the mobile telecommunications network, the first device comprising:
first processing circuitry; and
first memory containing instructions executable by the first processing circuitry whereby the first device is operative to:
determine, at the AF, that the access from the user equipment fulfills a predefined access pattern, wherein the predefined access pattern is fulfilled by the access of the user equipment that contradicts a subscription associated with accessing the user equipment; and
trigger sending of a control message to the PCN in response to the determination, wherein the control message controls the PCN to terminate a session with the user equipment and initiate deletion of a default bearer of a packet data network (PDN) connection of the user equipment; and
the PCN coupled to the AF, the PCN comprising a second device, the second device comprising:
second processing circuitry; and
second memory containing instructions executable by the second processing circuitry whereby the second device is operative to:
receive the control message from the AF;
trigger a termination of the session of the PCN with the user equipment in response to the reception of the control message, wherein, to trigger the termination of the session of the PCN with the user equipment, the second device is further operative to block the user equipment from establishing a connection via the PCN for a predefined time interval; and
delete the default bearer of the PDN connection of the user equipment.

* * * * *